No. 787,400. PATENTED APR. 18, 1905.
T. ROOS.
METHOD OF MANUFACTURING HAIR PINS OR THE LIKE.
APPLICATION FILED JAN. 12, 1905.

Witnesses
Geo W Kisenbaum
Raena H. Yudizky.

Theophilus Roos Inventor
By His Attorney Fred F. Schuetz

No. 787,400. Patented April 18, 1905.

UNITED STATES PATENT OFFICE.

THEOPHILUS ROOS, OF NEWARK, NEW JERSEY.

METHOD OF MANUFACTURING HAIR-PINS OR THE LIKE.

SPECIFICATION forming part of Letters Patent No. 787,400, dated April 18, 1905.

Application filed January 12, 1905. Serial No. 240,770.

*To all whom it may concern:*

Be it known that I, THEOPHILUS ROOS, a citizen of the United States of America, residing at Newark, in the county of Essex and State of New Jersey, have invented certain new and useful Improvements in Methods of Manufacturing Hair-Pins or the Like, of which the following is a specification.

My invention has reference to improvements in the manufacture of hair-pins and the like which are composed of a material becoming plastic under the application of heat and which are reinforced by a metallic core adapted to give strength to the pin or like article.

To this end my invention consists, essentially, in cutting into suitable length tubes formed of a material becoming plastic under the application of heat, inserting into these tubes wires of shorter length than the tubes, then dipping into cement to fill or seal the ends, and finally pointing said ends.

The nature of my invention will best be understood when described in connection with the accompanying drawings, in which—

Figure 1:
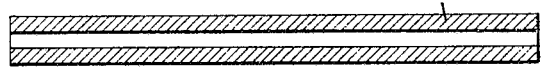
Figure 2:
Figure 3:
Figure 4:
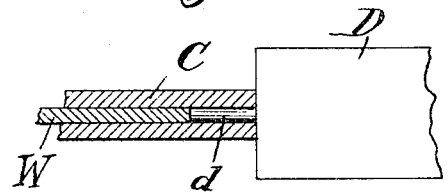

Figure 1 is a section of a tube of the material becoming plastic under the application of heat. Fig. 2 is a similar section showing a wire core inserted. Fig. 3 is a section of a finished length. Fig. 4 is a view, partly in section, showing the device for adjusting the wires.

Similar letters of reference designate corresponding parts throughout the several views.

For the sake of clearness the lengths are shown considerably out of proportion.

Referring now to Figs. 1 to 4, C designates a tube of a material becoming plastic under the application of heat, such as celluloid. I make the hair-pins or like articles from this tube by cutting it into suitable lengths, as shown in Fig. 2, then cutting a wire W, Fig. 2, into suitable lengths shorter than the tube C, so that the ends of the tube C project some distance beyond the ends of the wire W. The ends of the wire W are by preference first dipped into celluloid-cement and the wire is then inserted in the tube C and adjusted so as to leave the ends of the tube extending an equal distance beyond the ends of the wire, as shown in Fig. 2. For this purpose I employ a device such as shown in Fig. 4, consisting of a body D, forming a shoulder, and a projecting rod *d* of a diameter equal to or less than that of the wire W. The length of this rod is such that when it is inserted into the tube C, containing the wire W, the latter will be forced back by the rod *d* to the proper distance when the tube C abuts. The ends may or may not be sealed by dipping into a suitable cement, such as celluloid-cement, and the lengths are then ready to be pointed. For this purpose the lengths are placed into suitable dies, which are then heated and the whole subjected to pressure, whereby the ends of the tubes are pointed to the desired form. The lengths are then allowed to cool in the press or removed to a hand-press and allowed to cool. After cooling, the lengths are removed and then have the form shown in Fig. 3, both ends being pointed. The slight barb caused by the compression is removed by grinding or otherwise and the finished pieces are then bent to the desired form.

What I claim as my invention, and desire to secure by Letters Patent, is—

1. The method of forming hair-pins or the like which consists in cutting celluloid tubes into suitable lengths, inserting into these tubes wires of shorter length than the length of said tubes, so that equal lengths of the tube project beyond the said wires, and pointing the ends of said tubes containing the said wires.

2. The herein-described method for the manufacture of hair-pins and like articles consisting in cutting celluloid tubes into suitable lengths, inserting into these tubes wires of shorter length than the length of said tubes, so that equal lengths of the tube project beyond the said wires, sealing the ends of the tubes with a suitable cement and finally pointing the ends of said tubes containing said wires.

3. The herein-described method for the manufacture of hair-pins and the like consisting in cutting celluloid tubes into suitable lengths, inserting into these tubes wires of shorter length than the length of said tubes, so that equal lengths of the tubes project beyond the said wires, sealing the ends of the tubes with a suitable cement, and finally compressing the said tubes containing the said wires in dies so as to point the ends thereof.

In testimony whereof I have signed my name to this specification, in the presence of two subscribing witnesses, this 9th day of January 1905.

THEOPHILUS ROOS.

Witnesses:
CHAS. OSCHMANN,
AGNES GRAY.